(No Model.)
M. LISTON & L. WILSON.
AUTOMATIC DUMP FOR HOISTING BUCKETS.
No. 587,590. Patented Aug. 3, 1897.
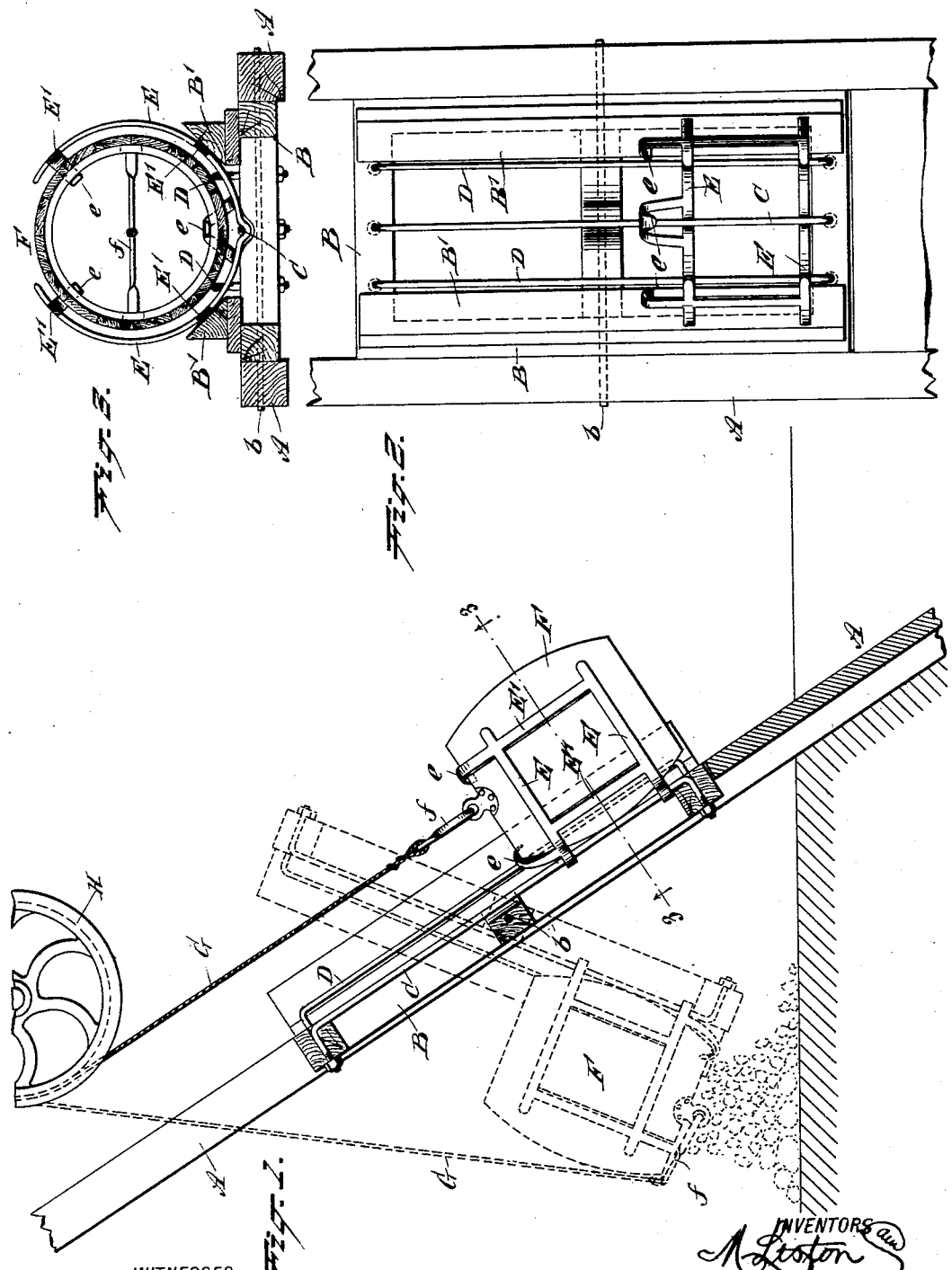
WITNESSES:
Henry T. Hirsch.
H. L. Reynolds.
INVENTORS
M. Liston
L. Wilson
BY
ATTORNEYS.

UNITED STATES PATENT OFFICE.

MATTHEW LISTON AND LUTHER WILSON, OF WARD, COLORADO.

AUTOMATIC DUMP FOR HOISTING-BUCKETS.

SPECIFICATION forming part of Letters Patent No. 587,590, dated August 3, 1897.

Application filed January 27, 1897. Serial No. 620,959. (No model.)

*To all whom it may concern:*

Be it known that we, MATTHEW LISTON and LUTHER WILSON, of Ward, in the county of Boulder and State of Colorado, have invented a new and Improved Automatic Dump for Hoisting-Buckets, of which the following is a full, clear, and exact description.

Our invention relates to an improvement in the mechanism for dumping hoisting-buckets by which the dumping is made automatic and the contents of the bucket are deposited to one side of the shaft.

It consists of an inclined and pivoted frame having attached to and sliding thereon a cage which is shaped so as to receive the buckets therein and provided at its upper end with hooks which project inwardly and engage the upper end of the bucket, so that the bucket will slide the cage up the inclined pivoted frame until the bucket will overbalance the frame and discharge the contents of the bucket.

The invention also consists of supporting slide-bars attached to the pivoted frame and extending longitudinally therewith inside the cage and above the bottom bars thereof. These serve to support the bucket above the cage, so that the bucket will not engage the cage to slide it up the incline until the bucket is entirely within the cage and engages the hooks upon the upper end thereof.

Reference is to be had to the accompanying drawings, forming a part of this specification, in which similar characters of reference indicate corresponding parts in all the figures.

Figure 1 is a side elevation of my device, showing the dumping position of the frame and its associated parts in dotted lines. Fig. 2 is a plan view of the frame and cage. Fig. 3 is a cross-sectional view taken on the line 3 3 of Fig. 1.

Our device is located at one side of a perpendicular shaft or incline up which the buckets are hoisted and so that the hoisting-rope G passes above the surface of the pivoted frame and longitudinally therewith. A sheave H, over which the hoisting-rope G passes, is located a little to one side of the shaft. As the bucket rises to the surface it engages the inclined ways A, up which it slides until it reaches the pivoted frame B. This frame consists of the framework B, which carries longitudinal bars B', beveled upon their upper inner surface, so as to form guides upon which the cage may slide. The pivot consists of a bar $b$, extending across the frame near its center and pivoted in the ways A. The frame is also provided with a central bar C, extending longitudinally with the frame and passing over the under bars E of the cage. This serves to hold the cage closely upon the slideways B', and yet permits a free motion of the cage beneath the same.

Two additional bars D, similar to the bars C, are placed at a little greater elevation above the bars E of the cage. These bars D form guides for the bucket F to slide upon while entering the cage and to prevent the weight of the bucket from resting upon the cage at this time and sliding the cage ahead of it. Being supported by the slides D, the bucket will not engage the cage E to slide the same until it engages the hooks $e$ upon the upper end of the cage. The cage, as shown in the drawings, consists of circular bars E, connected by longitudinal bars E'. The cage is made large enough to allow the bucket to enter freely between the sides of the cage and without touching the same.

The bars E are separated at the upper portion of the cage, leaving an opening through which the hoisting-rope G may readily pass. The upper ends of the longitudinal bars E' are bent inward to form the hooks $e$, which engage the upper end of the bucket and prevent its passing out at the top of the cage. The position of the bucket shown in full lines in Fig. 1 is the position when the bucket is within the cage and before the cage begins to slide up the incline.

As the hoisting-rope G is would up the bucket and the cage E are slid up the incline of the pivoted frame B until the cage reaches the upper end of the pivoted frame, when the weight of the bucket and its contents will be sufficient to overbalance the frame and tip it down to the position shown by dotted lines in Fig. 1. The bucket F in this position is held by the hooks $e$ with its upper end or opening downward, so that the contents of the bucket will be discharged. The bail $f$ of the bucket will be drawn down against the end of the bucket, and the rope or cable G being still attached thereto the whole device may be returned to its normal position by drawing upon the cable.

The bail $f$ upon the upper end of the bucket should be narrow enough to allow it to freely pass through the cage E.

Our device will make it possible to empty hoisting-buckets much more rapidly than would be possible by hand, and in addition makes the operation much safer, because the dumping of the bucket is at one side of the shaft instead of directly over the shaft. This device may be used for dumping any material from the buckets, either liquid material or solid material, such as ores or coal. It is also simple of construction and costs but little, and may be constructed at any point by ordinary mechanics. The invention also saves the labor of a man dumping the buckets.

Certain parts of our device—as, for instance, the cage—may be constructed in a somewhat different manner than as shown without changing the principles involved therein. We do not wish, therefore, to limit ourselves to the exact construction shown in the drawings.

Having thus described our invention, we claim as new and desire to secure by Letters Patent—

1. In an automatic dump for hoisting-buckets, the combination of a pivoted frame placed in the path of the rising buckets, with a cage mounted to slide on the frame and adapted to receive a bucket within it, and means for automatically securing the bucket to said cage, substantially as described.

2. In an automatic dump for hoisting-buckets, the combination of an inclined frame placed in the path of the rising buckets and provided with a cross-pivot near its middle, with a cage sliding on the frame and adapted to engage and secure the buckets thereto, substantially as described.

3. In an automatic dump for hoisting-buckets, the combination of a pivoted frame, a cage sliding on the frame, and adapted to receive the bucket, and provided upon its upper end with inwardly-projecting hooks or stops which engage the bucket to hold the same, substantially as described.

4. In an automatic dump for hoisting-buckets, the combination of a frame having a lateral pivot near its middle, with a cage sliding longitudinally on the frame and adapted to receive the buckets, and provided with inwardly-extending hooks upon its upper end, and slide-bars extending longitudinally of the frame inside the cage and adapted to support the buckets and prevent their engaging the cage while entering the same, substantially as described.

5. In an automatic dump for hoisting-buckets, the combination of a frame having a lateral pivot near its middle, with a cage sliding longitudinally on the frame and adapted to receive the bucket, and provided with inwardly-extending hooks upon its upper end, and means for supporting the buckets to prevent their engaging the cage while entering the same, substantially as described.

6. In an automatic dump for hoisting-buckets, the combination of a frame pivoted near its middle, with a cage mounted to slide upon said pivoted frame and having inwardly-projecting hooks upon its upper end, and open longitudinally upon the side away from the frame, substantially as described.

7. In an automatic dump for hoisting-buckets, the combination of a pivoted frame placed in the path of the rising buckets, with a cage mounted to slide on the frame and adapted to receive a bucket within itself, said cage being open longitudinally on the side away from the pivoted frame, and means for automatically securing the bucket to said cage, substantially as described.

8. In an automatic dump for hoisting-buckets, the combination of an inclined frame placed in the path of the rising buckets and provided with a cross-pivot near its middle, with a cage sliding on the frame, and adapted to engage and secure the buckets thereto, said cage being open longitudinally on the side away from the pivoted frame, substantially as described.

9. In an automatic dump for hoisting-buckets, the combination of a pivoted frame, a cage sliding thereon and adapted to receive the bucket, and provided upon its upper end with inwardly-projecting hooks or stops which engage the bucket to hold the same, and also being open longitudinally upon the side opposite the pivoted frame, substantially as described.

10. In an automatic dump for hoisting-buckets, the combination of a frame having a lateral pivot near its middle, with a cage sliding longitudinally thereon, adapted to receive the bucket and provided with inwardly-extending hooks upon its upper end, and also being open longitudinally upon the side opposite the pivoted frame, and slide-bars extending longitudinally of the frame inside the cage and adapted to support the buckets and prevent their engaging the cage while entering the same, substantially as described.

11. In an automatic dump for hoisting-buckets, the combination of a frame having a lateral pivot near its middle, with a cage sliding longitudinally thereon, adapted to receive the bucket and provided with inwardly-extending hooks upon its upper end, and also being open longitudinally upon the side opposite the pivoted frame, and means for supporting the buckets to prevent their engaging the cage while entering the same, substantially as described.

MATTHEW LISTON.
LUTHER WILSON.

Witnesses:
JAMES COMISKY,
PETER JOHNS.